United States Patent
Rao

(10) Patent No.: US 11,281,732 B2
(45) Date of Patent: Mar. 22, 2022

(54) RECOMMENDING DEVELOPMENT TOOL EXTENSIONS BASED ON MEDIA TYPE

(71) Applicant: Microsoft Technology Licensing, LLC, Redmond, WA (US)

(72) Inventor: Ramya Achutha Rao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 834 days.

(21) Appl. No.: 16/053,701

(22) Filed: Aug. 2, 2018

(65) Prior Publication Data

US 2020/0042648 A1 Feb. 6, 2020

(51) Int. Cl.
| | | |
|---|---|---|
| *G06F 16/00* | (2019.01) | |
| *G06F 16/9535* | (2019.01) | |
| *G06F 8/77* | (2018.01) | |
| *G06F 16/248* | (2019.01) | |
| *G06F 16/2457* | (2019.01) | |

(52) U.S. Cl.
CPC ............ *G06F 16/9535* (2019.01); *G06F 8/77* (2013.01); *G06F 16/248* (2019.01); *G06F 16/2457* (2019.01)

(58) Field of Classification Search
CPC ............................ G06F 16/2457; G06F 16/248
USPC ........................................................ 707/722
See application file for complete search history.

(56) References Cited

U.S. PATENT DOCUMENTS

| | | | | |
|---|---|---|---|---|
| 7,853,586 B1 * | 12/2010 | Patel | ................ | G06F 16/24578 707/722 |
| 8,069,413 B2 * | 11/2011 | Methot | .................... | G06F 9/453 715/705 |
| 8,126,878 B2 * | 2/2012 | Krasnow | ............. | G06F 16/4393 707/722 |
| 8,396,859 B2 * | 3/2013 | Green | ................. | G06F 16/3322 707/713 |
| 8,694,988 B2 * | 4/2014 | Goldman | ............ | G06F 9/44526 717/174 |
| 8,812,482 B1 * | 8/2014 | Kapoor | ................. | G06F 16/273 707/713 |
| 2007/0208762 A1 * | 9/2007 | Lunt | ....................... | G06F 16/41 707/707 |

(Continued)

OTHER PUBLICATIONS

"MIME", retrieved from <<https://en.wikipedia.org/wiki/MIME>>, Jun. 9, 2018, 9 pages.

(Continued)

*Primary Examiner* — Alexandria Y Bromell
(74) *Attorney, Agent, or Firm* — Ogilvie Law Firm

(57) ABSTRACT

Extensions to add functionality to an extensible computing technology development tool are identified based at least in part on whether they support a media type that is associated with a file being opened in the development tool. The extensible tool may be a software development tool or a hardware development tool. Complex recommendation mechanisms in the form of collaborative filtering, user preference history content-based filtering, and demographic profile-based recommendations, are avoided, thereby making recommendation actions faster and less resource-intensive. Users have discretion as to how often a tool extension marketplace is searched, and discretion as to how much detail is shown in presenting the search results.

20 Claims, 6 Drawing Sheets

(56) References Cited

U.S. PATENT DOCUMENTS

| | | | | |
|---|---|---|---|---|
| 2009/0254971 | A1* | 10/2009 | Herz | G06Q 30/0603 726/1 |
| 2010/0198815 | A1* | 8/2010 | Poston | G06F 16/248 707/722 |
| 2010/0287525 | A1* | 11/2010 | Wagner | G06F 8/20 717/100 |
| 2011/0270678 | A1* | 11/2011 | Drummond | G06Q 30/0641 705/14.52 |
| 2012/0296746 | A1* | 11/2012 | Bleadall | G06F 16/332 705/14.66 |
| 2013/0145361 | A1* | 6/2013 | Kaegi | G06F 40/10 717/176 |
| 2014/0089287 | A1* | 3/2014 | Connolly | G06F 16/954 707/707 |
| 2015/0169691 | A1* | 6/2015 | Bedrax-Weiss | G06F 16/951 707/722 |
| 2015/0277883 | A1* | 10/2015 | Giammaria | G06F 8/60 707/722 |
| 2015/0302067 | A1* | 10/2015 | Eluard | G06F 16/248 707/722 |
| 2016/0019231 | A1* | 1/2016 | Twito | G06F 16/148 707/722 |
| 2018/0165362 | A1* | 6/2018 | Engelko | G06F 16/35 707/707 |

OTHER PUBLICATIONS

Jennifer Kyrnin, "What Is a File Extension and MIME Type?", retrieved from <<https://www.lifewire.com/file-extensions-and-mime-types-3469109>>, Apr. 20, 2018, 14 pages.

"Media type", retrieved from <<https://en.wikipedia.org/wiki/Media_type>>, Jun. 21, 2018, 6 pages.

Harysh Menon, "Tips and tricks for search on Visual Studio Marketplace", retrieved from <<https://blogs.msdn.microsoft.com/devops/2016/05/13/tips-and-tricks-for-search-on-visual-studio-marketplace/>>, May 13, 2016, 4 pages.

"Managing Plugins", retrieved from <<https://www.jetbrains.com/help/idea/managing-plugins.html>>, Jun. 26, 2018, 2 pages.

Peter Gromov, "Custom file types in IntelliJ IDEA", retrieved from <<https://blog.jetbrains.com/idea/2010/09/custom-file-types-in-intellij-idea/>>, Sep. 14, 2010, 5 pages.

Ar Vicco, "Change file association manually", retrieved from <<https://intellij-support.jetbrains.com/hc/en-us/community/posts/206237949-Change-file-association-manually>>, Jan. 2, 2012, 17 pages.

"Register New File Type Association Dialog", retrieved from <<https://www.jetbrains.com/help/webstorm/register-new-file-type-association-dialog.html>>, May 11, 2018, 2 pages.

"Visual Studio Extensibility", retrieved from <<https://en.wikipedia.org/wiki/Visual_Studio_Extensibility>>, May 27, 2018, 3 pages.

"Programming tool", retrieved from <<https://en.wikipedia.org/wiki/Programming_tool>>, Jun. 26, 2018, 4 pages.

Ramya Rao, "adding suggestion to search for extension for files are of unknown mime type #40269", retrieved from <<https://github.com/Microsoft/vscode/pull/40269>>, Dec. 15, 2017, 2 pages.

Ramya Rao, "Add extension recommendations for mimetypes not supported out of the box #38543", retrieved from <<https://github.com/Microsoft/vscode/issues/38543>>, Nov. 16, 2017, 4 pages.

"Recommender system", retrieved from <<https://en.wikipedia.org/wiki/Recommender_system>>, Jul. 4, 2018, 8 pages.

"Visual Studio Code", retrieved from <<https://en.wikipedia.org/wiki/Visual_Studio_Code>>, Jul. 7, 2018, 8 pages.

"Extensions for the Visual Studio family of products", retrieved from <<https://marketplace.visualstudio.com/>>, no later than Jul. 7, 2018, 2 pages.

"Extensions for the Visual Studio family of products", retrieved from <<https://marketplace.visualstudio.com/vscode>>, no later than Jul. 7, 2018, 2 pages.

Dustin Marx, "Determining File Types in Java", retrieved from <<https://dzone.com/articles/determining-file-types-lava>>, Mar. 4, 2015, 11 pages.

\* cited by examiner

UNUSED TOOL EXTENSION RECOMMENDATION CODE 304
- COLLABORATIVE FILTERING CODE 902
- CONTENT-BASED FILTERING CODE 904
- USER DEMOGRAPHIC PROFILE 908 USAGE CODE 906

Fig. 9

DEVELOPMENT TOOL CHARACTERIZING FEATURES 1000
- TOOL INCLUDES SOURCE CODE EDITOR 1002
- TOOL IN INTEGRATED DEVELOPMENT ENVIRONMENT 1004
- TOOL LANGUAGE AGNOSTIC 1006 WITHOUT EXTENSIONS
- TOOL INCLUDES VSCODE-BASED CODE 1008
- TOOL INCLUDES USER INTERFACE 1010 RENDERER 414 AND TOOL EXTENSION HOST 402
- TOOL HAS OTHER DISTINCTIVE FEATURES 1012

Fig. 10

EXTENSION-PROVIDED TOOL FUNCTIONALITIES 1100
- SOURCE CODE 1102 COMPILATION 1104
- PROGRAMMING LANGUAGE 1106 SYNTAX CHECKING 1108
- PROGRAM 1110 DEBUGGING 1112 | CODE COLORING 1114
- IDENTIFIER 1116 AUTO-COMPLETION 1118
- REPOSITORY 1120 WORKFLOW INTEGRATION 1122
- CLOUD 1124 ACCESS 1126 | DATABASE 1128 ACCESS 1130

Fig. 11

RECOMMENDING DEVELOPMENT TOOL EXTENSIONS BASED ON MEDIA TYPE

BACKGROUND

Noon Software and computing hardware are created, tested, feature enhanced, corrected, performance optimized, and otherwise developed using computing technology development tools. Familiar functions of such development tools include text editing functions, design functions, syntax checking, source code completion, automatic and computer-assisted code generation, compiling, executable building, defect detection and debugging, provisioning and deployment, circuit layout, diagnostics, programming, and performance monitoring and profiling, for example. Computing technology development tools partially or fully automate such functions, in order to improve developer productivity and reduce downtime or time-to-market. Some development tools are stand-alone programs, while other development tools are provided in a suite for coordinated usage, such as an integrated development environment. Some development tools are tailored to one or more particular programming languages while other tools, or at least portions thereof, are programming language agnostic, meaning they do not rely on or take advantage of features that are specific to a particular programming language.

SUMMARY

Some computing technology development tools are tailored to interoperate with tool extensions, which add functionality to the development tool. Some development tool extensions are available through public or private tool extension marketplaces. Some teachings herein were motivated by an initial technical challenge of identifying relevant development tool extensions from among a large and growing body of development tool extensions, and informing software developers that the relevant tool extensions were available and why the tool extensions are deemed relevant; similar considerations apply to hardware development tools which are implemented with software. A subordinate challenge was how to enhance existing search capabilities of a public extension tool marketplace. Other technical challenges addressed by the innovations taught here will also be apparent to one of skill from the discussion provided below.

Some embodiments recommend tool extensions to a user of an extensible computing technology development tool, on the relevance basis of the tool extensions' support for a media type that also pertains to a file opened in the development tool. Media types may be indicated by, or be associated with, file extensions or file MIME types, for example.

In some embodiments, a development tool includes a user interface renderer which communicates with a tool extension via an agent, and in some cases the tool extension interfaces directly with an extension host, which may be remote from the renderer. The renderer and the host may be on the same machine, or on different machines, depending on the particular development tool implementation. More generally, an extensible development tool is configured to interoperate with development tool extensions that add functionality to the development tool.

In some embodiments, development tool extension recommendation actions include (i) determining that a file which is specified to the computing technology development tool has a particular media type, (ii) ascertaining that the particular media type has no assigned associated tool extension known to the development tool, (iii) querying a tool extension marketplace with at least one query to find whether a tool extension that is associated with the particular media type is available from the tool extension marketplace, (iv) receiving a query result, and (v) displaying tool extension availability information which is based on at least a portion of one or more results of the at least one query. Tool extension availability information may indicate that no relevant tool extension was found in the marketplace, or it may indicate that one or more relevant tool extensions were found without specifically identifying the found tool extensions, or it may specifically identify relevant tool extensions found in response to the query.

Some embodiments use or provide a method for use in recommending a development tool extension, including receiving a command from a user specifying a file which has a media type; automatically ascertaining that the media type has no assigned associated tool extension known to a development tool; querying a tool extension marketplace with at least one query to find whether a tool extension that is associated with the media type is available from the tool extension marketplace; receiving a query result; automatically parsing the query result; and displaying, to the user, extension availability information which is based on at least a portion of the parsed query result.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 9 is a block diagram illustrating some kinds of recommendation code which are not relied upon, are excluded, or are otherwise avoided in some example development tool extension recommendation systems discussed herein;

FIG. 10 is a block diagram illustrating some characterizing features of some development tools;

FIG. 11 is a block diagram illustrating some functionalities of some development tool extensions;

DETAILED DESCRIPTION

Overview

Figure 1:
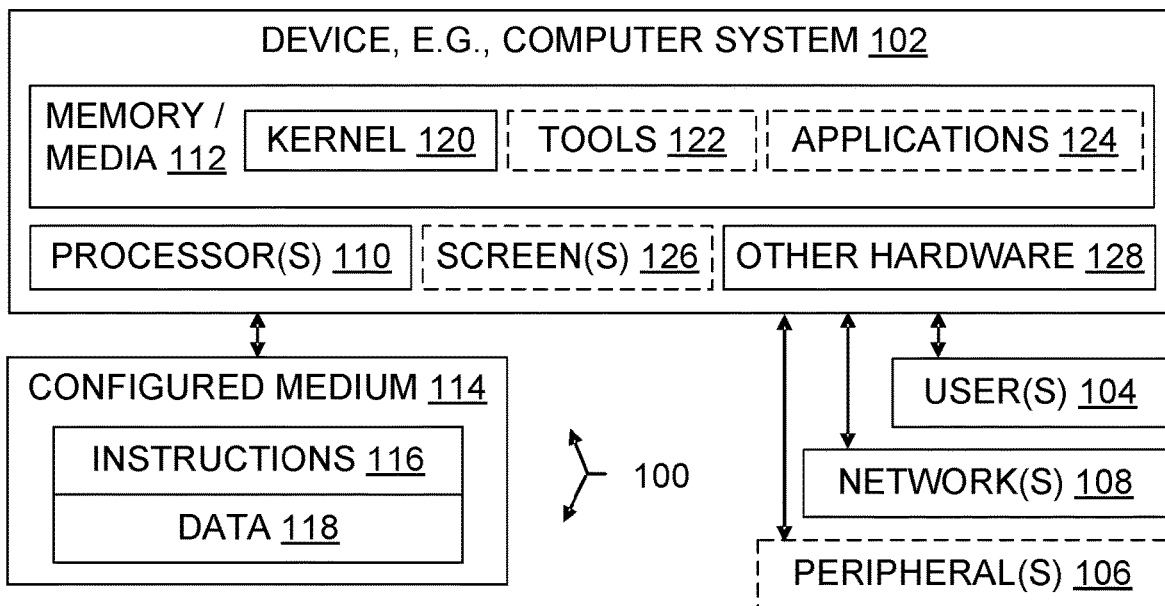
FIG. 1 is a block diagram illustrating a computer system and also illustrating a configured storage medium.

An act of resource recommendation may be deferential to user evaluations of recommended items, e.g., a recommendation may display to a user a list of resources without any ranking of the listed resources. In this case, resource ranking is left to the user or to other actors. Another recommendation may show less deference, by ranking resources in a manner the user is presumed to find helpful, or by asserting to the user that particular resources displayed in the recommendation have particular benefits above and beyond whatever search criteria from the user led to the identification and display of resources matching those criteria.

Regardless of how deferentially a recommendation system behaves, some aspects of the recommendation system will have uses independent of their use in making recommendations. For example, processors and memories in a system that provides recommendations may also provide computing support for activities other than generating recommendations. Similarly, resources which appear in recommendations do so because they have functionality that is useful apart from the act of appearing in a recommendation, and development tools which can use the recommended resources also have development uses that are independent of providing an operating context for a recommendation system. Accordingly, although a broad technological context is provided in many examples, the innovative aspects of computing technology that are described herein are focused on recommendations. These innovative aspects focus, for instance, on how recommendations are triggered, obtained, constrained, and reported, not on the broader environment in which recommendations play a role.

Many innovations expand beyond their origins, but understanding an innovation's origins can help one more fully appreciate the innovation. In the present case, innovations in recommendation arose in the context of the inventor seeking ways to improve the usability of a software development tool known in the industry as "VS Code". The name "VS Code" refers to versions of a software development tool known as Visual Studio® Code (mark of Microsoft Corporation). "Visual Studio® Code" is abbreviated herein as "VS Code". VS Code implementations use a multi-process architecture which includes at least a user interface renderer process and an extension host process. One of VS Code's capabilities is text editing. The text being edited is often computer program source code. The renderer process is programming language agnostic; programming language support is built into VS Code extensions and accessed through the extension host process.

VS Code editing can be used with any text file, not merely with program source code text files. A large number of file types exist, including many text files containing various kinds of content. Over time, it is likely that even more file types will be created or used by computing technology developers. Many of the file types are unknown to VS Code, or any other particular development tool, in the sense that no particular behaviors or functionalities specific to the file type are implemented in the development tool, at least not by default or without some further tailoring action (e.g., loading a tool extension). One challenge was how to tell users which VS Code extensions could potentially improve their experience when editing such files of an unknown type.

When a version of VS Code that is enhanced as taught herein encounters a file type for the first time, it sends a query to an established VS Code extension marketplace seeking any extension whose metadata indicates that the extension matches the file's MIME type. The user is informed of the results. The user may merely be told that one or more relevant extensions exist in the marketplace, or the user may be given a more detailed report identifying at least one specific relevant VS Code extension. Although VS Code usage appears in many examples in this document, one of skill will acknowledge that the teachings provided herein are not all limited to VS Code contexts, and may also be applied to enhance other computing technology development tools.

Some embodiments described herein may be viewed by some people in a broader context. For instance, concepts such as development, extension, querying, recommendation, and type may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to reduce memory usage by editable text or speed file loading into a text editor. Other configured storage media, systems, and methods involving development, extension, querying, recommendation, or type are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Some embodiments address technical activities that are rooted in computing technology and improve the functioning of computing systems by helping those systems make more extensive use of development tool extensions.

Technical effects provided by some embodiments include a more flexible use of tool extension metadata in queries, and broader availability of relevant development tool extensions.

Some embodiments include technical adaptations such as extension recommendation subsystem codes with algorithm-constrained content, query-enabled and query-disabled lists, and tool extension availability information based on file media type.

Other advantages based on the technical characteristics of the teachings will also be apparent to one of skill from the description provided.

Acronyms, Abbreviations, and Names

Some acronyms, abbreviations, and names are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DAP: debug adapter protocol
DVD: digital versatile disk or digital video disc
FPGA: field-programmable gate array
FPU: floating point processing unit
GPU: graphical processing unit
GUI: graphical user interface
HTML: hypertext markup language
HTTP: hypertext transfer protocol
HTTPS: hypertext transfer protocol secure
IDE: integrated development environment, sometimes also called "interactive development environment"
IP: internet protocol
Java: programming language
LAN: local area network
LSP: language server protocol
MIME: multipurpose internet mail extensions
OS: operating system
RAM: random access memory
ROM: read only memory
TCP/IP: transmission control protocol/internet protocol
UDP: user datagram protocol
URI: uniform resource identifier
VS Code: Visual Studio® Code program (mark of Microsoft Corp.)
WAN: wide area network Note Regarding Hyperlinks Portions of this disclosure contain URIs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have these URIs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, and so on.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network or computing system environment.

"Cloud" means pooled resources for computing, storage, and networking which are elastically available for measured on-demand service. A cloud may be private, public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as running a renderer, executing a tool extension, communicating between a development tools and a tool extension market, communicating over a network, automatically ascertaining a lack of assigned associated tool extensions, and parsing query results are understood herein as inherently digital. A human mind cannot interface directly with a CPU or other processor, or with RAM or other digital storage, to read and write the necessary data to perform the extension environment configuring and extension recommendation steps taught herein. This would be well understood by persons of skill in the art in view of the present disclosure, but others may sometimes need to be informed or reminded of the facts. Unless stated otherwise, embodiments are also presumed to be capable of operating at scale (i.e., one thousand or more primary users) in production environments, or in testing labs for production environments, as opposed to being mere thought experiments.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, ascertaining, assigning, associating, avoiding, compiling, connecting, communicating, configuring, debugging, determining, disabling, displaying, editing, enabling, executing, finding, identifying, listing, parsing, prompting, querying, receiving, rendering, restricting, running, searching, sending, showing, specifying, using, utilizing, verifying (and accesses, accessed, ascertains, ascertained, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, device drivers
122 tools, e.g., anti-virus software, firewalls, packet sniffer software, intrusion detection systems (IDS), intrusion prevention systems (IPS), software development tools and tool suites, hardware development tools and tool suites
124 applications, e.g., word processors, web browsers, spreadsheets, games, email tools
126 display screens, also referred to as "displays"
128 computing hardware not otherwise associated with a reference number 106, 108, 110, 112, 114
202 developer system
204 extension market; "market" and "marketplace" are used interchangeably herein
206 extensible computing technology development tool; may also be referred to as "computing technology development tool", or "development tool"
208 extension market search interface; may be implemented, e.g., using one or more APIs
210 extension to a computing technology development tool; may also be referred to as a "plug-in" or "tool extension"; includes binary or other executable code; not to be confused with a file extension 310
212 query from developer system to extension market
214 query reply from extension market to developer system; also referred to as "query response" or "query result"
300 tool extension recommendation system
302 extension recommendation subsystem
304 executable code in extension recommendation subsystem
306 computing technology development file, namely, a file containing data which is useful for software or hardware development
308 file media type
310 file extension; appears in filename, such as ".doc" or ".txt"; not to be confused with tool extension 210
312 query data generally, e.g., queries 212, query responses 214, tool extension availability information 716 based on query response(s)
314 software not otherwise specifically called out in FIG. 3, e.g., kernel 120, applications 124 that may be present on the system 300 in addition to the extension recommendation subsystem code 304
316 hardware, e.g., processor(s) 110, memory 112, screen 126, other computing system 102 hardware
318 list of media types for which queries to the extension market have been disabled
320 list of media types for which queries to the extension market have been enabled
400 software development tool; this is an example of a computing technology development tool 206, which in turn is an example of a tool 122
402 software development tool extension host 404 software development tool extension API
406 programming language server, e.g., a Java language server, TypeScript server, Python server or other programming-language specific server
408 debug adapter, e.g., a Java language debug adapter or Python debug adapter or other programming-language-specific or debugger-specific or runtime-specific debug adapter
410 file contents
412 software development tool code not otherwise called out in FIG. 4; may include extension host communication agent, spawned processes, an additional extension host, or other code, for example
414 renderer portion of a software development tool; not to be confused with a rendering engine whose primary purpose is generating computer graphics, such as a ray tracing rendering engine or other image synthesis code which provides control over camera placement, light placement, shading, texture mapping, and other visual effects data; the renderer 414 renders a tool user interface typically used for viewing and editing source code text or similar file contents which is processed to produce executable software
416 filesystem, also sometimes referred to as "file system"; system software which controls how data is stored and retrieved; typically includes use of at least a filename and names of one or more directories in a hierarchy of directories; a filesystem path is used to locate the file so its contents can be read or written
502 extension host communication agent
504 developer machine
506 extension machine
602 virtual machine
604 hypervisor
606 processor, memory, other hardware supporting virtual machine(s)
702 tag on tool extension
704 tool extension metadata, including, e.g., tag 702, creator ID, creation date, access control list or other access permissions, hash based on content, content signature(s)
706 query data not otherwise specifically called out in FIG. 7, e.g., checksums, digital certificates, transmission protocol headers and footers
708 Boolean variable or bitflag indicating whether one or more relevant tool extensions were found as a result of the corresponding query; "relevant" means compliant with the search criteria provided, e.g., supportive of media type(s) specified in the query
710 count (natural number) indicating how many relevant tool extensions were found as a result of the corresponding query
712 list identifying by name, URI or other address, handle, or other tool extension identifier one or more relevant tool extensions
714 query result data not otherwise specifically called out in FIG. 7, e.g., checksums, digital certificates, transmission protocol headers and footers
716 tool extension availability information
802 file data generally
804 header field associated with a file; may indicate file's media type
806 file metadata, e.g., tags, associated media type(s), creator ID, creation date, access control list or other access permissions, hash based on file content, file content signature(s)
902 executable code which performs or invokes algorithms or data structure that are specific to collaborative filtering, in the course of prompting, obtaining, computing, constraining, or reporting to a user a recommendation of one or more tool extensions 210
904 executable code which performs or invokes algorithms or data structure that are specific to content-based filtering based on a description of the tool extension and a profile of a user's preferences, in the course of prompting, obtaining, computing, constraining, or reporting to the user a recommendation of one or more tool extensions 210
906 executable code which performs or invokes algorithms or data structure that are specific to use of a user's demographic profile in the course of prompting, obtaining, computing, constraining, or reporting to the user a recommendation of one or more tool extensions 210
908 a user's demographic profile
1000 features which characterize a development tool or a set of development tools
1002 inclusion of a source code editor in the development tool
1004 inclusion of the development tool in an integrated development environment
1006 the development tool is agnostic with regard to programming languages, namely, not tailored to any particular programming language, at least when no language-specific extension has been installed to operate with the tool
1008 the development tool includes vscode-based code, namely, code from a vscode open source project, or compiled from source code from a vscode open source project, or a derivative work of such code under applicable copyright law, where vscode open source project includes a project identified as "vscode" or "VS Code" at the time of filing of this application which is maintained at the time of filing of this application on or through the github dot corn website
1010 development tool user interface
1012 any other distinctive feature of a development tool which is described herein but not specifically called out in FIG. 10
1100 functionality which may be implemented in a development tool extension
1102 source code
1104 compilation functionality; also refers to act of source code compilation
1106 programming language
1108 program source code syntax-checking functionality
1110 program, e.g., kernel, tool, application, or other software
1112 program debugging functionality; also refers to act of debugging
1114 source code coloring functionality; functionality; also refers to act of assigning different colors to displayed source code based on syntax
1116 identifier in source code
1118 identifier auto-completion functionality; also refers to act of automatically completing partially typed identifier or presenting developer with a list of identifiers which match a partially typed identifier
1120 code repository, e.g., a github dot corn project
1122 integration of software development tool with a code repository to facilitate development acts such as checking out a copy of source code or checking back into the repository a modified copy of source code 1124 cloud
1126 cloud access functionality; also refers to act of accessing a file or service in a cloud from a location not necessarily in the same cloud
1128 database
1130 database access functionality; also refers to act of accessing a database
1200 method(s) for recommending tool extension(s)
1202 receive a command in or through a development tool user interface
1204 specify a file, e.g., by naming or pointing to the file
1206 determine a media type that is associated with a file
1208 discover that a tool extension which is associated with a media type in the tool extension's metadata has been assigned within a development tool or extension market to a list of tool extensions that are relevant to files of that media type
1210 assign a tool extension, which is associated with a media type in the tool extension's metadata, to a list of tool extensions that are relevant to files of that media type
1212 recommend to a user one or more relevant tool extensions
1214 ascertain that no tool extension is associated with a given media type, or at least not assigned as relevant within a development tool or extension market
1216 conform with a query filter or other restriction on queries
1218 query filter or other restriction on queries, e.g., search criteria or precondition to search
1220 query a tool extension market by sending the market a query 212
1222 receive a query result 214
1224 parse a query result, e.g., locate flag 708 or count 710 or list 712
1226 display information to a user, e.g., on a screen 126
1300 flowchart
1302 add functionality to development tool, e.g., by installing tool extension(s)
1304 prompt a development tool user, e.g., through a user interface text prompt, dialog box prompt, or other visual event, possibly in conjunction with an audio event
1306 limit the number of times a user is prompted for particular input or with a particular kind of output
1308 restrict querying 1220
1314 check whether a market has previously been queried by or on behalf of a particular user to find extensions associated with a particular media type
1316 verify that a media type is not on a query-disabled list
1318 verify that a media type is on a query-enabled list
1320 avoid using certain recommendation codes in a development tool or other code that provides tool extension recommendations, e.g., avoid using one or more of codes 902, 904, 906
1322 display information indicating no relevant tool extension was found in a market
1324 indicate no relevant tool extension was found in a market
1326 display information indicating at least one relevant tool extension was found in a market
1328 indicate at least one relevant tool extension was found in a market
1330 display a list of one or more relevant tool extensions
1332 use file extension(s) to indicate respective media type(s)
1334 any other step discussed herein but not specifically called out in FIG. 13
1336 display a list of media types supported by one or more assigned extensions
1338 display a list of media types not supported by any assigned extensions
1340 search without finding any relevant tool extension in a market
1342 find at least one relevant tool extension in a market
1344 use a tag on a tool extension to indicate one or more media types associated with the tool extension
1346 use tool extension metadata to indicate one or more media types associated with the tool extension

OPERATING ENVIRONMENTS

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, software developers, hardware developers, engineers, and end-users are each a particular type of user 104, although it is contemplated that most users will likely be software developers who are end-users of a software development tool. Automated agents, scripts, playback software, and the like acting on behalf of one or more people may also be users 104, e.g., to facilitate testing a system 102, but end-users are people (not processes) unless clearly indicated otherwise. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

A given operating environment 100 may include an Integrated Development Environment (IDE) 122 which provides a developer with a set of coordinated computing technology development tools 122 such as compilers, source code editors, profilers, debuggers, layout tools, simulators, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but many teachings herein are applicable with a wide variety of programming languages, programming models, and programs.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104, but unless clearly indicated otherwise, end-users are human.

In some embodiments, the system includes multiple computers connected by a network 108. Networking interface equipment 128 can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

Figure 2:
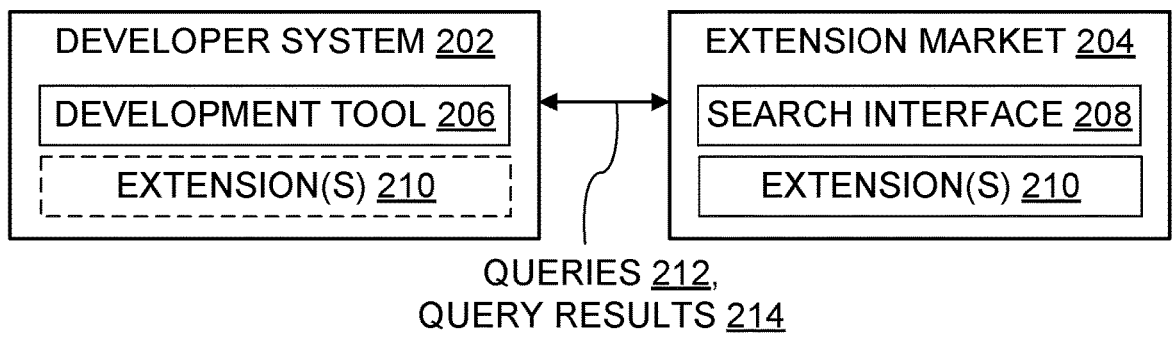
FIG. 2 is a block diagram illustrating aspects of a computing technology development environment which includes a developer system with a development tool and an extension market with development tool extensions and a search interface.

With particular reference to FIG. 2, some embodiments include or operate in a development environment that includes a developer system 202 configured to communicate with an extension marketplace 204. A development tool 206 runs on the developer system 202, and communicates via queries 212 and query results 214 (also called query responses 214) with a search interface 208 of the marketplace. In particular, queries 212 seek information about tool extensions 210 that are in, or available through, the marketplace 204. Extensions 210 may be downloaded to the developer system 202 from the marketplace 204, to be installed in the development tool 206 in order to enhance the functionality of the development tool 206.

Figure 3:
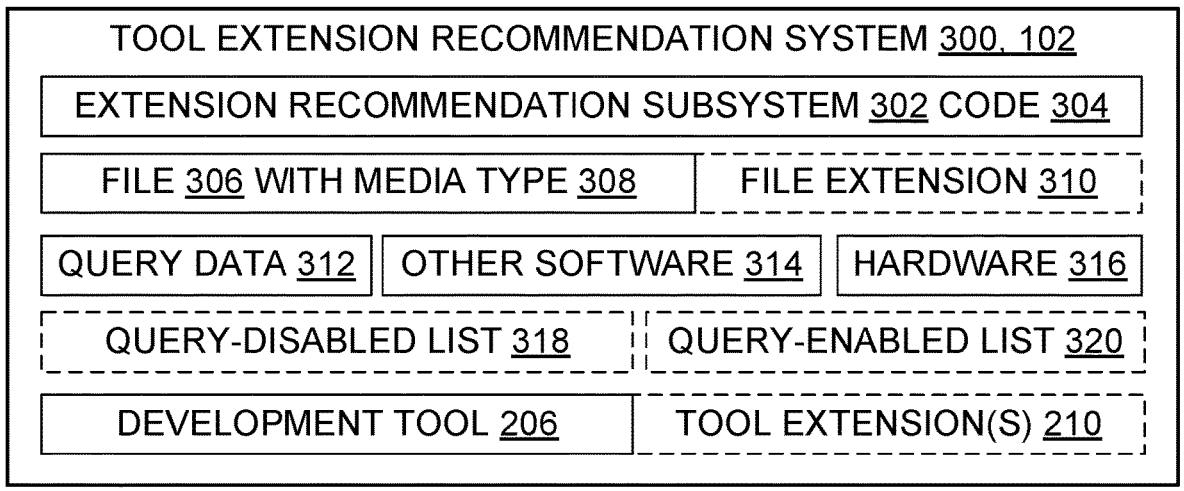
FIG. 3 is a block diagram illustrating aspects of a development tool extension recommendation system.

With particular reference to FIG. 3, configuring a system with a developer tool and enhancements according to teachings herein provides a tool extension recommendation system 300. The recommendation system 300 includes hardware 316, such as a processor 110 which executes extension recommendation subsystem code 304. The processor 110 may also execute other software 314, such as a kernel 120. The extension recommendation code 304 and the processor 110 executing it and the memory 112 holding the code 304 together form an extension recommendation subsystem 302. The extension recommendation subsystem 302 may be a subsystem embedded within a development tool 206, or it may be a separate subsystem in a surrounding system 202, 300.

In this example, the extension recommendation code 304 uses file extensions 310 or file metadata or other mechanisms to determine which media type(s) 308 are associated with a given file 306. Then, if no relevant tool extensions 210 have been assigned to the media types for this user, the extension recommendation code 304 queries one or more marketplaces 204 in search of such extensions. The queries 212 sent and the responses 214 received are each examples of query data 312. Whether queries are sent regarding a particular media type 308 may depend in some implementations on whether the media type appears on a query-disabled list 318 or a query-enabled list 320. Some media types have no use for an extension, so queries using those media types can be disabled in order to reduce the load on the extension marketplace. Also, a query-enabled list can be used to restrict queries in order to reduce the load on the marketplace.

Figure 4:
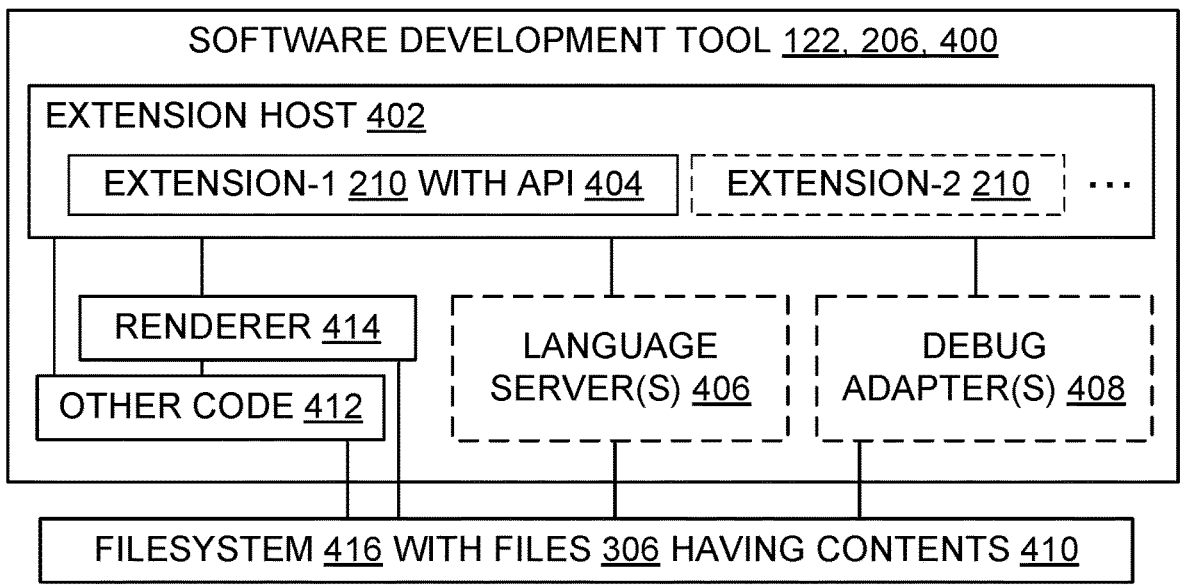
FIG. 4 is a block diagram illustrating aspects of a development tool according to some development tool architectures, including a user interface renderer, and also including one or more extensions in an extension host.

With reference to FIG. 4, a software development tool 400 includes a user interface portion, referred to here as a renderer 414, and also includes one or more hosted tool extensions 210. The tool extensions are hosted by an extension host 402 portion of the development tool 400, via an extension API 404.

Figure 5:
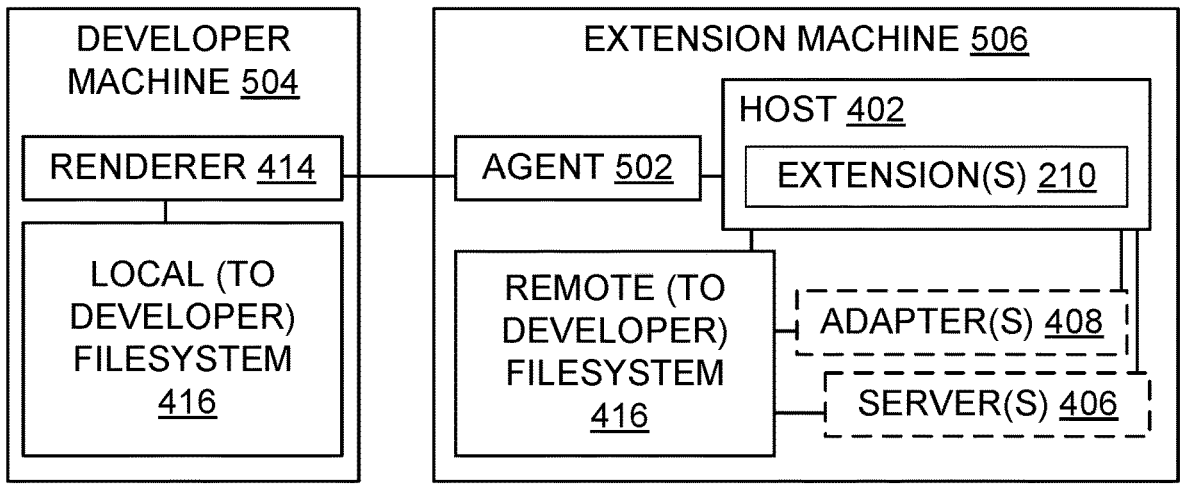
FIG. 5 is a block diagram illustrating aspects of a development tool system according to some development tool architectures which include a developer machine with a user interface renderer, and also include an extension machine with an agent and with one or more extensions in an extension host.

As indicated in FIG. 5 and with continued reference to FIG. 4, some additional development tool components may include a communications agent 502, programming language server(s) 406, debug adapters(s) 408, and other code 412. The connection between the renderer 414 and the agent 502 may be a network 108 connection, and may use one or more familiar network communication protocols such as TCP/IP, UDP, HTTPS, and so on. Extension host 402 communication with a debug adapter 408 may utilize a debug adapter protocol. Communication with a language server 406 may utilize a language server protocol.

As indicated in FIG. 5, the components of a development tool 400 may reside in two distinct machines. In this example architecture, the machine with the renderer 414 is referred to as the developer machine 504 because it is where the developer 104 interfaces directly with the development tool 400. The other machine(s) are each referred to as an extension machine 506 because the extension(s) 210 run on them. Thus, a filesystem 416 on the developer machine 504 (if such a filesystem is present) may be considered a "local" filesystem because it is local to the developer, whereas the filesystem on the extension machine 506 may be considered a "remote" filesystem because it is remote from the developer.

FIGS. 4 and 5 are examples, not a complete inventory. One of skill will acknowledge that teachings herein about obtaining and using tool extension recommendations may also be applied with other development tool architectures.

Figure 6:
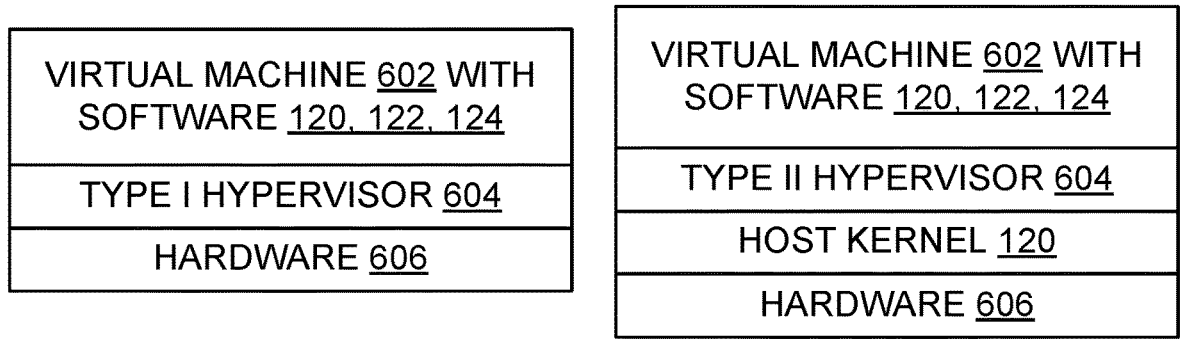
FIG. 6 is a diagram illustrating two operating environments for a virtual machine.

With reference to FIG. 6, a developer machine 504 and an extension machine 506 may each be a physical machine, or may be a virtual machine 602 running on underlying physical machine hardware 606 by way of at least a hypervisor 604. The hypervisor 604 may be a "bare metal" or type I hypervisor running directly on the hardware 606, or it may be a type II hypervisor which runs on a host operating system or another kernel that in turn runs directly on the hardware 606. Hardware 606 includes at least one processor 110 having one or more cores, and RAM or other working memory in operable communication with the processor(s) having a storage capacity. The physical machine(s) or virtual machine(s) may each be located in a cloud, or not.

Figure 7:
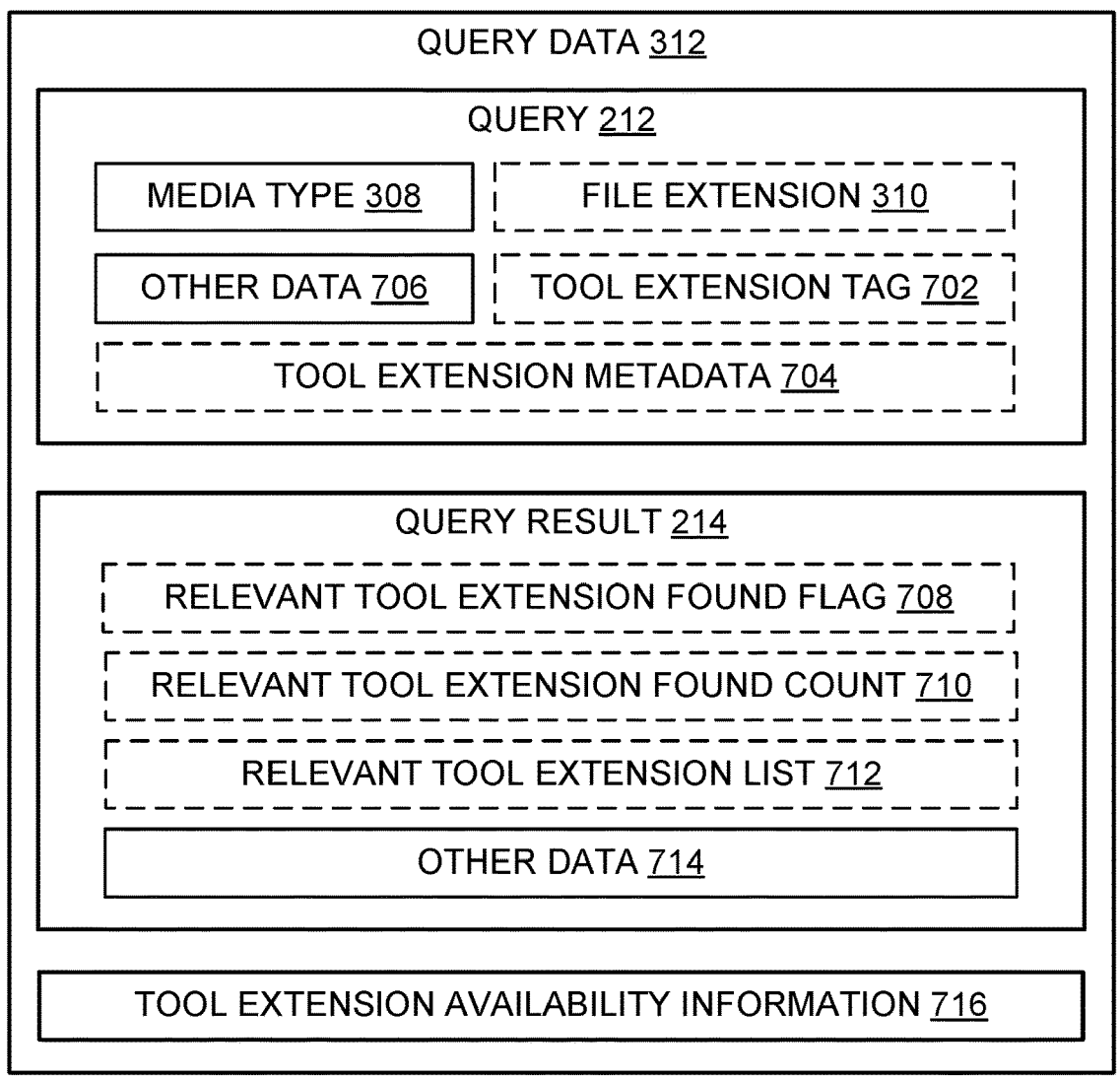
FIG. 7 is a block diagram illustrating aspects of a query to an extension marketplace and aspects of a result to such a query.

FIG. 7 illustrates aspects of some implementations of query data 312. In this example, a query 212 may include one or more media types 308 to indicate what value(s) to search for among tool extension tags 702 or other extension metadata 704. Alternately or in addition, a query 212 may include copies of tool extension tags 702 or other tool extension metadata 704 directly instead of listing media types 308. A query 212 may alternately or in addition include a proxy value for a media type, such as a file extension 310 value.

In this example, a query result 214 may indicate that no relevant tool extension was found, e.g., by setting an extensions-found flag 708 to False, or an extensions-found count 710 to zero, or a list 712 of tool extensions to empty or Null, or a combination thereof. Conversely, if one or more relevant extensions are found, then a result 214 may include an extensions-found flag 708 set to True, or an extensions-found count 710 set to a non-zero value indicating how many relevant extensions were found, or a non-empty list 712 of at least some of the tool extensions found, or a combination thereof.

Figure 8:
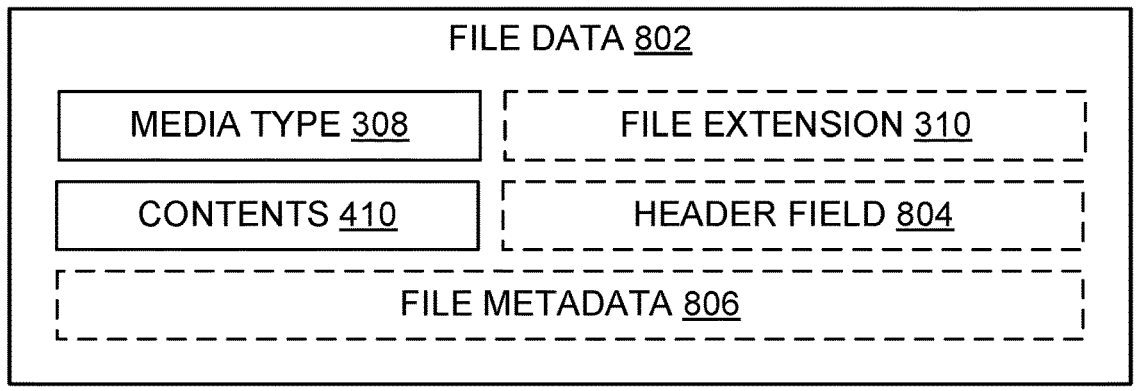
FIG. 8 is a block diagram illustrating some aspects of files.

FIG. 8 illustrates data 802 which is in or associated with one or more files in some embodiments. A file may have an associated media type 308, which may be indicated or implemented in various ways, e.g., by a file extension 310, as a MIME type in a header field 804, in other metadata 806, or explicitly or implicitly in the file contents 410. The Internet Assigned Numbers Authority (IANA) is an authority for the standardization and publication of media types. In many implementations, a media type includes a two-part identifier for file formats and file contents, including a type and a subtype. For example, the type could be "text" and the subtype could be "html" or "plain" or "csv". Media types 308 are sometimes used, for instance, when transmitting a file over a network using HTTP or HTML. They may also be used when selecting an application to open a file, based on a predefined association between the application and the file extension.

FIG. 9 illustrates several types of recommendation code 902, 904, 906 that are not used in tool extension recommendation code 304. That is, the tool extension recommendation code 304 is implemented without invoking or relying functionally on these kinds of code 902, 904, 906. In other words, these kinds of code 902, 904, 906 are avoided in most (perhaps all, it may develop) implementations. The avoided codes include collaborative filtering code 902, content-based filtering code 904, and code 906 which utilizes a demographic profile 908 of a user 104 to perform tool extension recommendation acts.

FIG. 10 illustrates several features 1000 that may distinguish one development tool implementation or configuration from another. Some development tools 206 include a source code editor 1002, while others do not. Some are part of an integrated development environment 1004; others are not. Some are language agnostic 1006 before tool extensions 210 are installed; others are language-specific even without any extensions installed. Some are based on vscode code 1008, while others are not. Some development tools 206 include a renderer 414 in their user interface 1010 and an extension host 402, while the user interfaces of other development tools do not have a distinct renderer process that communicates with a distinct extension host process.

FIG. 11 illustrates a few of the many functionalities 1100 that can be added to an extensible development tool 206. The illustrated examples include source code 1102 compilation 1104, programming language 1106 syntax checking 1108, program 1110 debugging, syntax-based code coloring 1114, identifier 1116 auto-completion 1118, repository 1120 workflow integration 1122, cloud 1124 access 1126, and database 1128 access 1130.

Some embodiments provide or use a computing technology development tool extension recommendation system 300 which is configured for use in recommending tool extensions 210 to a user of the computing technology development tool 206. The system includes a processor 110 and a memory 112 in operable communication with the processor. An extensible computing technology development tool 206 is executable with the processor 110 and is configured to interoperate with development tool extensions 210 that add functionality to the computing technology development tool. A tool extension recommendation subsystem 302 code is executable with the processor to perform tool extension recommendation actions which include (i) determining that a file 306 which is specified to the computing technology development tool has a particular media type 308, (ii) ascertaining that the particular media type has no assigned associated tool extension 210, (iii) querying a tool extension marketplace 204 with at least one query 212 to find whether a tool extension that is associated with the particular media type is available from the tool extension marketplace, (iv) receiving a query result 214, and (v) displaying tool extension availability information 716 which is based on at least a portion of one or more results of the at least one query.

In some embodiments, determining that the specified file has a particular media type is based at least in part on at least one of the following: a file extension 310 of the file, a header field 804, metadata 806 of the file, or contents 410 of the file.

In some embodiments, the subsystem 302 is further configured to restrict tool extension marketplace queries by doing at least one of the following before querying the tool extension marketplace: verifying that the media type 308 is not on a query-disabled list 318 of media types regarding which the tool extension marketplace should not be queried, or verifying that a file extension 310 of the file is not on a query-disabled list 318 of file extensions regarding which the tool extension marketplace should not be queried. In some of these, tool extension marketplace query restrictions are configured in at least one of the following ways: the query-disabled list of media types includes a plain text media type, the query-disabled list of media types includes a log media type, the query-disabled list of file extensions includes a plain text file extension, or the query-disabled list of file extensions includes a log file extension.

In some embodiments, the computing technology development tool extension recommendation subsystem 302 is characterized in at least one of the following ways: the tool extension recommendation subsystem is configured to prompt the user at most once per media type 308 per session with an option to display tool extension marketplace query results, or the tool extension recommendation subsystem is configured to prompt the user at most once per file extension 310 with an option to display tool extension marketplace query results.

In some embodiments, the computing technology development tool extension recommendation subsystem 302 is characterized in at least one of the following ways: the tool extension recommendation subsystem is free of code 902 which upon execution performs collaborative filtering to provide a tool extension recommendation, the tool extension recommendation subsystem is free of code 904 which upon execution performs content-based filtering using a profile of the user's preferences to provide a tool extension recommendation, the tool extension recommendation subsystem is free of code 906 which upon execution uses a demographic profile 908 of the user to provide a tool extension recommendation.

In some embodiments, the computing technology development tool 206 is further characterized by having at least one of the following features: the computing technology development tool includes a programming language source code editor 1002, the computing technology development tool is part of an integrated development environment 1004, the computing technology development tool is programming language agnostic 1006 when no tool extensions 210 are installed to interoperate with the computing technology development tool, the computing technology development tool includes vscode-based code 1008, or the computing technology development tool includes a user interface renderer 414 and a tool extension host 402 which communicate with one another during execution of the computing technology development tool.

Some embodiments also include at least one tool extension 210 which is configured to interoperate with the computing technology development tool 206 and which adds at least one of the following functionalities 1100 to the computing technology development tool: source code compilation functionality 1104 for at least one programming language, syntax-checking functionality 1108 for at least one programming language, program debugging functionality 1112, identifier auto-completion functionality 1118 for a source code editor, syntax-based source code coloring 1114 for a source code editor, source code repository workflow integration 1122 with the computing technology development tool, cloud-based development or testing environment access 1126, or SQL database access 1130.

Other system embodiments are also described herein, either directly or derivable as system versions of described methods or configured media, informed by the extension discussion herein of computing hardware.

Methods

Figure 12:
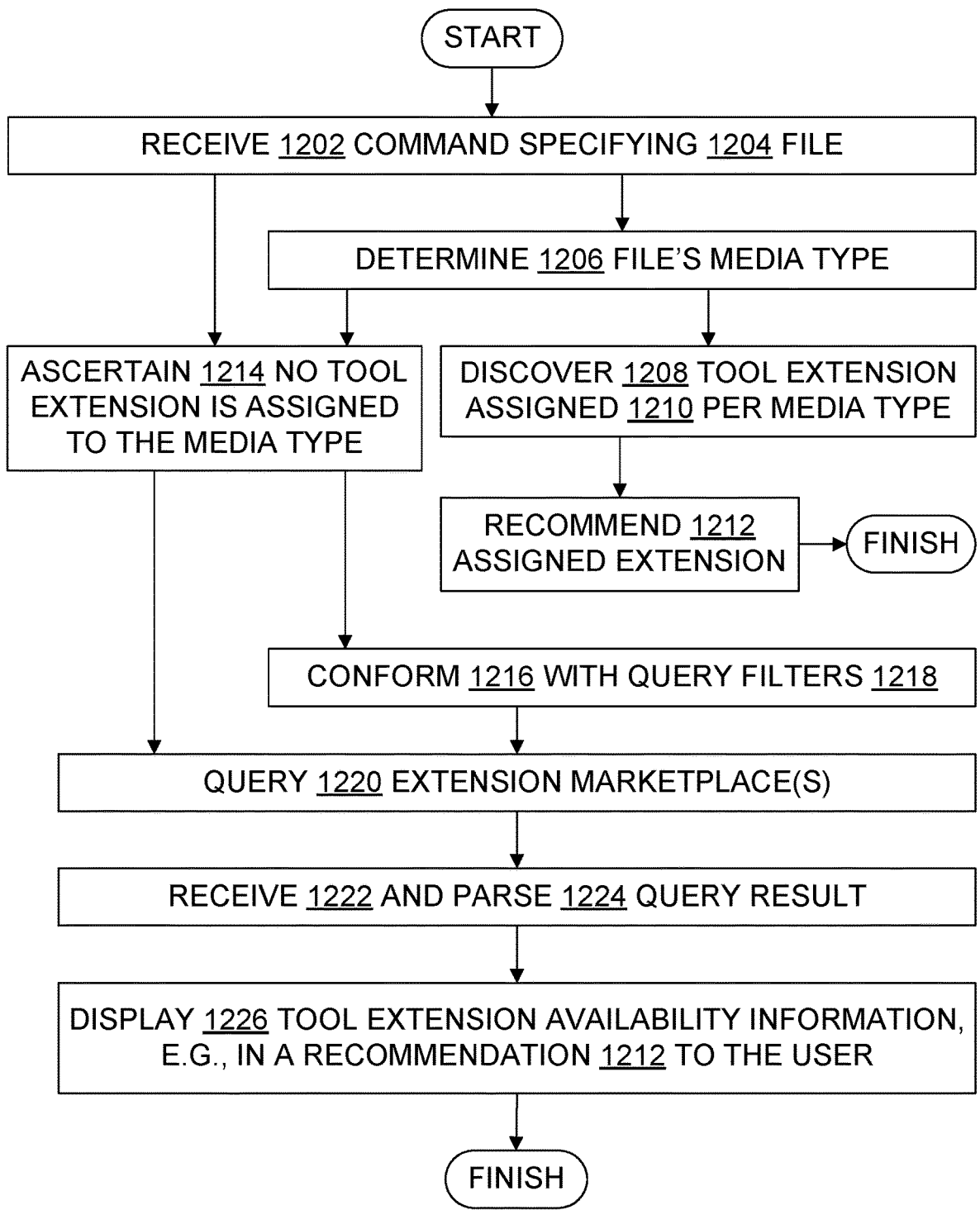
FIG. 12 is a flowchart illustrating some example development tool extension recommendation methods.
Figure 13:
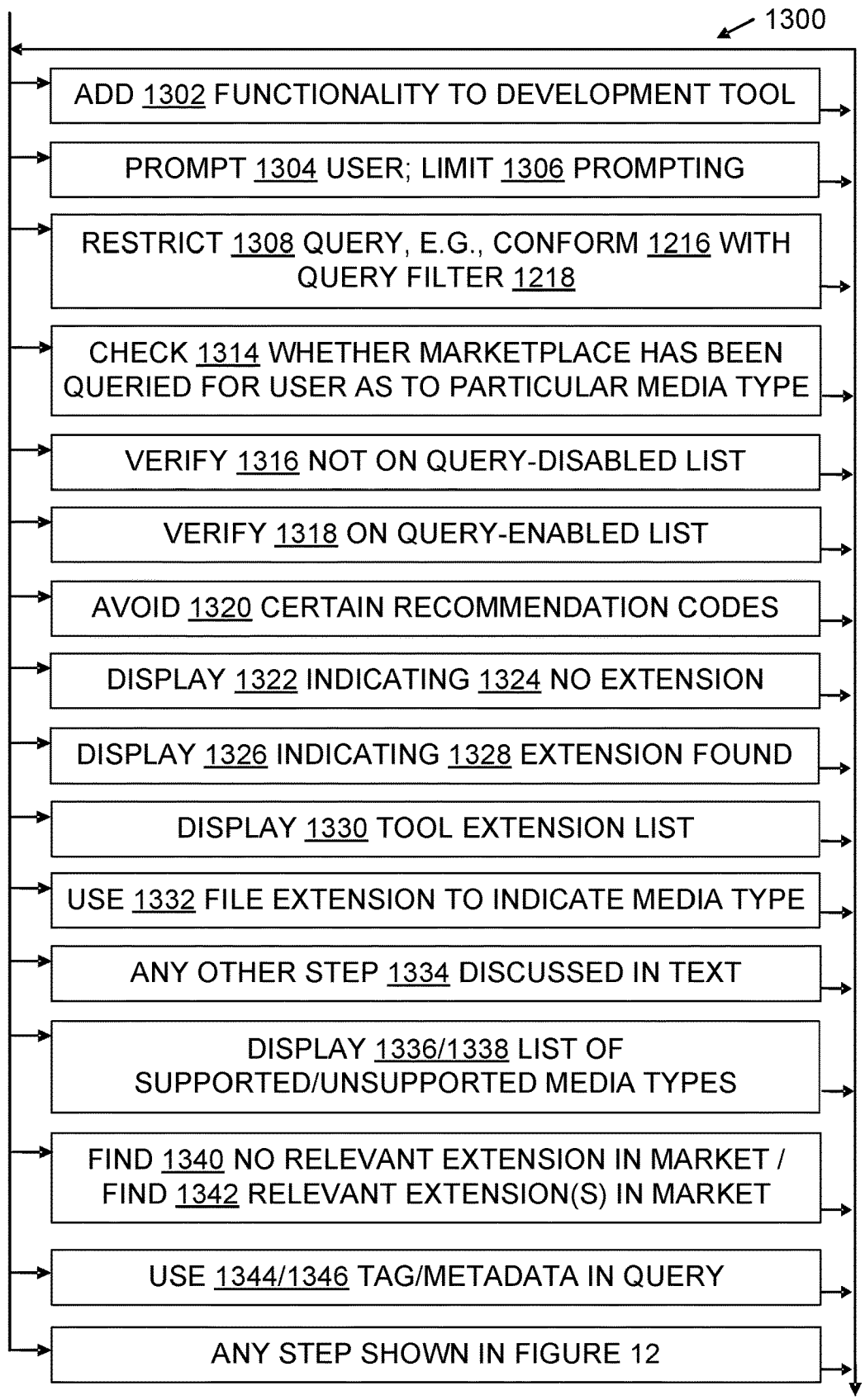
FIG. 13 is a flowchart further illustrating steps in some development tool recommendation methods.

With particular reference to FIGS. 12 and 13, some embodiments provide or use a method for use in recommending a development tool extension. In this example, the method is performed by a computing technology development tool 206 which is executed by a processor 110. This method includes: receiving 1202 a command from a user specifying 1204 a file, the file having a media type 308; automatically ascertaining 1214 that the media type has no assigned associated tool extension 210; querying 1220 a tool extension marketplace 204 with at least one query 212 to find whether a tool extension that is associated with the media type is available from the tool extension marketplace; receiving 1222 a query result 214; automatically parsing 1224 the query result; and displaying 1226, to the user, extension availability information 716 which is based on at least a portion of the parsed query result.

In some embodiments, the method further includes prompting 1304 the user after automatically ascertaining that the media type has no assigned associated tool extension. This prompting includes prompting the user whether to query the tool extension marketplace. Then querying 1220 the tool extension marketplace occurs in response to a prompting result (e.g., user input) which indicates that the tool extension marketplace is to be queried.

In some embodiments, the method further includes checking 1314 whether the tool extension marketplace has previously been queried 1220 on behalf of the user to find whether a tool extension that is associated with the media type is available from the tool extension marketplace. Then querying 1220 the tool extension marketplace occurs in response to a checking result which indicates that the tool extension marketplace has not previously been queried on behalf of the user to find whether a tool extension associated with the media type is available.

In some embodiments, the method includes verifying 1318 that the media type is on a query-enabled list 320 of media types regarding which the tool extension marketplace should be queried, and then querying 1220 the tool extension marketplace in response to the verifying 1318. In some embodiments, the method includes verifying 1316 that the media type is not on a query-disabled list 318 of media types regarding which the tool extension marketplace should not be queried, and then querying 1220 the tool extension marketplace in response to the verifying 1316.

In some embodiments, displaying 1226 extension availability information includes displaying to the user an indication 716 that no tool extension associated with the media type was found in the tool extension marketplace. In some, displaying 1226 extension availability information includes displaying to the user an indication 716 that at least one tool extension associated with the media type was found in the tool extension marketplace. In some, displaying 1226 extension availability information includes displaying to the user a list 716 of one or more tool extensions, each of which is associated with the media type and is available from the tool extension marketplace.

Technical methods shown in the Figures or otherwise disclosed will be performed automatically, e.g., by a text editor process executing on a computer system, unless otherwise indicated. Methods may also be performed in part automatically and in part manually to the extent action by a human administrator or other human person is implicated, e.g., by inputting a filename or a command or other data to the development tool. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIGS. 12 and 13. Steps may be performed serially, in a partially overlapping manner, or fully in parallel. In particular, the order in which flowchart 1200 or flowchart 1300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as queries 212, query responses 214, extension recommendation code 304, and query restriction lists 318, 320, in the form of data 118 and instructions 116, read from a removable storage medium 114 and/or another source such as a network connection, to form a configured storage medium. The configured storage medium 112 is capable of causing a computer system to perform technical process steps for recommending development tool extensions 210, as disclosed herein. The Figures thus help illustrate configured storage media embodiments and process embodiments, as well as system and process embodiments. In particular, any of the process steps illustrated in FIG. 12 or 13, or otherwise taught herein, may be used to help configure a storage medium to form a configured storage medium embodiment.

Some embodiments use or provide a computer readable storage medium 112 configured with code 116, 118 which upon execution by a processor 110 performs a method for use in recommending a software development tool extension. The method includes determining 1206 that a specified file 306 has a particular media type 308; ascertaining 1214 that the particular media type has no assigned associated tool extension 210; querying 1220 a software development tool extension marketplace 204 with at least one query 212 to find whether a tool extension that is associated with the particular media type is available from the software development tool extension marketplace; receiving 1222 a query result 214; and displaying 1226 tool extension availability information 716 which is based on at least a portion of one or more results of the at least one query.

In some embodiments, querying the software development tool extension marketplace includes listing in a query 212 at least one file extension 310 which denotes the particular media type.

In some embodiments, the method further includes showing 1336 a user a list of supported media types 308, each of which has at least one associated tool extension available from the software development tool extension marketplace. In some, the method includes showing 1338 a user a list of unsupported media types 308, each of which has no associated tool extension available from the software development tool extension marketplace.

In some embodiments, querying the software development tool extension marketplace includes listing in at least one query at least one tool extension tag 702. This allows the query to find whether a tool extension that is associated with the listed tool extension tag is available from the software development tool extension marketplace. In some embodiments, querying the software development tool extension marketplace includes listing in at least one query at least one tool extension metadata value 704, to find whether a tool extension that is associated with the listed tool extension metadata value is available from the software development tool extension marketplace.

Visual Studio® Code Example

The following discussion is derived from a description of how a remote execution tool architecture, data structures and associated algorithms were created for a software development tool known as Visual Studio® Code (mark of Microsoft Corporation). "Visual Studio® Code" is abbreviated herein as "VS Code". One of skill will recognize in this discussion many teachings which are also described elsewhere herein and which either appear in patent claims or could be claimed. However, as with the other code-specific examples provided herein, it does not follow that every part of this discussion, or any particular details therein, are required to satisfy legal criteria such as enablement, written description, or best mode. Also, embodiments are not limited to the particular programming languages, tool contexts, identifiers, fields, class definitions, or other implementation choices described in this discussion or elsewhere herein. The discussion of VS Code provided here is specific to this patent disclosure. Any apparent conflict with any other patent disclosure, even from the owner of the present innovations, has no role in interpreting the claims presented in this patent disclosure.

VS Code is a development tool 122 that uses a multi-process architecture on a single machine. Upon opening a new graphical user interface window in a version of the VS Code tool, a renderer process 414 is created. In some implementations, the renderer process is labeled as "window (hover.ts—vscode)", as shown in the example process tree below. The renderer process 414 is responsible for rendering the user interface ("UI"), handling user input, reading or writing files to disk, and other interactive features. One feature the renderer process manages is file watching, which leads to the creation of a watcherService process. The renderer process 414 is programming language agnostic. Accordingly, all programming language support is built as VS Code extensions 210. The renderer process spawns an extension host process 402 (labeled in some implementations as "extension Host") and it loads extensions inside this process. The extensions 210 themselves can also spawn additional processes if they wish to do so, e.g., tsserver, tslintServer, and jsonServerMain are processes spawned by extensions 210 themselves.

A typical process tree for opening a TypeScript project in a VS Code tool resembles the following:

| CPU % | Mem MB | PID | Process |
| --- | --- | --- | --- |
| 13 | 49 | 41094 | code-insiders main |
| 0 | 33 | 41095 | gpu-process |
| 0 | 33 | 41101 | shared-process |
| 0 | 98 | 42234 | window (hover.ts - vscode) |
| 0 | 33 | 42237 | extensionHost |
| 0 | 475 | 42240 | electron_node electronForkStart.js tssserver.js |
| 0 | 16 | 42252 | electron_node typingsInstaller.js tsserver.js typeMap.js |
| 0 | 16 | 42241 | electron_node tslintServer.js |
| 0 | 16 | 42270 | electron_node jsonServerMain.js |
| 0 | 16 | 42238 | watcherService |

In some implementations, extensions 210 are built on a "vscode" API which operates such that all reading APIs are synchronous and all editing, modifying, or other writing APIs are asynchronous. In some examples, an extension host executes independently of the renderer process. For instance, a renderer process can interpret user input (e.g. typing in an editor) even if the connection to the extension host is interrupted or terminated. In some examples, an extension API is synchronous for reading and asynchronous for writing. This architectural choice is followed as much as possible in some examples. In some, it may always be possible to make the extension API asynchronous for both reading and writing, but that might not give a consistent picture of the state of the renderer process.

In some embodiments, when user a loads a file of unknown MIME type in the editor, the enhanced editor or other enhancement in the development tool suggests to the user that a search be made (by the tool) for a tool extension in the marketplace supporting that file extension.

One consideration in implementing teachings herein is whether to prompt for every unknown file, or instead use a whitelist. Many file types are not supported out of the box in VS Code and developers rely on tool extensions to provide features like syntax highlighting and simple language support. One approach is to add such extensions for popular file types to a recommendation list so that a recommendation system can prompt the user when such files are first opened. Some examples are sass, stylus, cake tool extensions.

An alternative to keeping track of a whitelist of unsupported file extensions and the corresponding recommendations is to show a prompt that says something like "Support for files with extension abc is better with extensions from the marketplace." One of the options presented in the prompt would be "Search marketplace". Another option would be "Never show again" which would ensure that no further prompts are made for the file extension "abc". A third option would be "Close". One refinement is to maintain a whitelist of file extensions for which the tool extension recommender does not present the preceding prompt. For example, .txt, .log file extensions could be excluded.

In short, in some implementations when a file with unknown/unsupported file type is opened, a search for related extensions in the marketplace is made in the background. If the search yields any results, then the user is prompted about the results with an option to search and display the same. In this implementation, the prompt is not repeated regardless of what the user reaction to the prompt is. This is unlike the extension recommendation prompt which re-appears as long as user chooses not to do so.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants describe above.

CONCLUSION

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 12 and 13 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing technology development tool extension recommendation system configured for use in recommending tool extensions to a user of the computing technology development tool, the system comprising:
   a processor;
   a memory in operable communication with the processor;
   an extensible computing technology development tool which is executable with the processor and is configured to interoperate with development tool extensions that add functionality to the computing technology development tool; and
   a tool extension recommendation subsystem includes code which is executable with the processor to perform tool extension recommendation actions which include (i) determining that a file which is specified to the computing technology development tool has a particular media type, (ii) ascertaining that the particular media type has no assigned associated tool extension, (iii) querying a tool extension marketplace with at least one query to find whether a tool extension that is associated with the particular media type is available from the tool extension marketplace, (iv) receiving a query result, and (v) displaying tool extension availability information which is based on at least a portion of one or more results of the at least one query.

2. The system of claim 1, wherein determining that the specified file has a particular media type is based at least in part on at least one of the following: a file extension of the file, a header field, metadata of the file, or contents of the file.

3. The system of claim 1, wherein the subsystem is further configured to restrict tool extension marketplace queries by doing at least one of the following before querying the tool extension marketplace:
   verifying that the media type is not on a query-disabled list of media types regarding which the tool extension marketplace should not be queried; or
   verifying that a file extension of the file is not on a query-disabled list of file extensions regarding which the tool extension marketplace should not be queried.

4. The system of claim 3, wherein tool extension marketplace query restrictions are configured in at least one of the following ways:
   the query-disabled list of media types includes a plain text media type;
   the query-disabled list of media types includes a log media type;
   the query-disabled list of file extensions includes a plain text file extension;
   the query-disabled list of file extensions includes a log file extension.

5. The system of claim 1, wherein the computing technology development tool extension recommendation subsystem is characterized in at least one of the following ways:
   the tool extension recommendation subsystem is configured to prompt the user at most once per media type with an option to display tool extension marketplace query results; or
   the tool extension recommendation subsystem is configured to prompt the user at most once per file extension with an option to display tool extension marketplace query results.

6. The system of claim 1, wherein the computing technology development tool extension recommendation subsystem is characterized in at least one of the following ways:
   the tool extension recommendation subsystem is free of code which upon execution performs collaborative filtering to provide a tool extension recommendation;
   the tool extension recommendation subsystem is free of code which upon execution performs content-based filtering using a profile of the user's preferences to provide a tool extension recommendation;
   the tool extension recommendation subsystem is free of code which upon execution uses a demographic profile of the user to provide a tool extension recommendation.

7. The system of claim 1, wherein the computing technology development tool is further characterized by having at least one of the following features:
   the computing technology development tool includes a programming language source code editor;
   the computing technology development tool is part of an integrated development environment;
   the computing technology development tool is programming language agnostic when no tool extensions are installed to interoperate with the computing technology development tool;
   the computing technology development tool includes vscode-based code; or
   the computing technology development tool includes a user interface renderer and a tool extension host which communicate with one another during execution of the computing technology development tool.

8. The system of claim 1, further comprising at least one tool extension which is configured to interoperate with the computing technology development tool and which adds at least one of the following functionalities to the computing technology development tool:
   source code compilation functionality for at least one programming language;
   syntax-checking functionality for at least one programming language;
   program debugging functionality;
   identifier auto-completion functionality for a source code editor;
   syntax-based source code coloring for a source code editor;
   source code repository workflow integration with the computing technology development tool;
   cloud-based development or testing environment access; or
   SQL database access.

9. A method for use in recommending a development tool extension, the method performed by a computing technology development tool which is executed by a processor, the method comprising:
   receiving a command from a user specifying a file, the file having a media type;
   automatically ascertaining that the media type has no assigned associated tool extension;
   querying a tool extension marketplace with at least one query to find whether a tool extension that is associated with the media type is available from the tool extension marketplace;
   receiving a query result;
   automatically parsing the query result; and
   displaying, to the user, extension availability information which is based on at least a portion of the parsed query result.

10. The method of claim 9, further comprising prompting the user after automatically ascertaining that the media type has no assigned associated tool extension, the prompting including prompting the user whether to query the tool extension marketplace, and wherein querying the tool extension marketplace occurs in response to a prompting result which indicates that the tool extension marketplace is to be queried.

11. The method of claim 9, further comprising checking whether the tool extension marketplace has previously been queried on behalf of the user to find whether a tool extension that is associated with the media type is available from the tool extension marketplace, and wherein querying the tool extension marketplace occurs in response to a checking result which indicates that the tool extension marketplace has not previously been queried on behalf of the user to find whether a tool extension associated with the media type is available.

12. The method of claim 9, further comprising one of the following sequences:
   verifying that the media type is on a query-enabled list of media types regarding which the tool extension marketplace should be queried, and then querying the tool extension marketplace in response to the verifying; or
   verifying that the media type is not on a query-disabled list of media types regarding which the tool extension marketplace should not be queried, and then querying the tool extension marketplace in response to the verifying.

13. The method of claim 9, wherein displaying extension availability information comprises displaying to the user an indication that no tool extension associated with the media type was found in the tool extension marketplace.

14. The method of claim 9, wherein displaying extension availability information comprises displaying to the user an indication that at least one tool extension associated with the media type was found in the tool extension marketplace.

15. The method of claim 14, wherein displaying extension availability information comprises displaying to the user a list of one or more tool extensions, each of which is associated with the media type and is available from the tool extension marketplace.

16. A computer readable storage medium configured with code which upon execution by a processor performs a method for use in recommending a software development tool extension, the method comprising:
- determining that a specified file has a particular media type;
- ascertaining that the particular media type has no assigned associated tool extension;
- querying a software development tool extension marketplace with at least one query to find whether a tool extension that is associated with the particular media type is available from the software development tool extension marketplace;
- receiving a query result; and
- displaying tool extension availability information which is based on at least a portion of one or more results of the at least one query.

17. The computer readable storage medium of claim 16, wherein querying the software development tool extension marketplace comprises listing in a query at least one file extension which denotes the particular media type.

18. The computer readable storage medium of claim 16, wherein the method further comprises showing a user at least one of the following:
- a list of supported media types, each of which has at least one associated tool extension available from the software development tool extension marketplace;
- a list of unsupported media types, each of which has no associated tool extension available from the software development tool extension marketplace.

19. The computer readable storage medium of claim 16, wherein querying the software development tool extension marketplace further comprises listing in at least one query at least one tool extension tag, to find whether a tool extension that is associated with the listed tool extension tag is available from the software development tool extension marketplace.

20. The computer readable storage medium of claim 16, wherein querying the software development tool extension marketplace further comprises listing in at least one query at least one tool extension metadata value, to find whether a tool extension that is associated with the listed tool extension metadata value is available from the software development tool extension marketplace.

* * * * *